Dec. 18, 1934.  W. M. THOMAS  1,984,953
DOUBLE LENS STRUCTURE
Filed Nov. 21, 1933

INVENTOR
WILLIAM M. THOMAS
By
Ford W. Harris
ATTORNEY.

Patented Dec. 18, 1934

1,984,953

UNITED STATES PATENT OFFICE 1,984,953

DOUBLE LENS STRUCTURE

William M. Thomas, Los Angeles, Calif.

Application November 21, 1933, Serial No. 698,998

3 Claims. (Cl. 88—16.6)

My invention relates to a novel lens system. This lens system is particularly well adapted for use in a projection system. It is in this connection that the details of the present invention will be specifically described, though it should be understood at the outset that the lens and method herein disclosed are not limited to use in conjunction with a motion picture projector, nor to a color process.

It is often desirable to utilize a pair of lens systems, each covering corresponding frames of a film. In such a system I have found it very desirable that the optical axes of these lens systems be spaced apart a distance substantially equal to the center-to-center spacing of the frames so that the optical axes can extend parallel to each other and be respectively in alignment with the centers of the frames. It is an object of the present invention to provide such a lens system, as well as a novel method for forming same.

In centrally disposing these optical axes with respect to adjacent frames of a motion picture film, I find it desirable to flaten the adjacent portions of the lens systems, thus permitting the use of relatively large lenses. It is an object of the present invention to provide a double-lens means including two lens systems positioned side by side, the adjacent portions of each lens system being ground off to permit the optical axis to lie closer together than would otherwise be the case.

One difficulty which has been experienced in a dual-lens system, especially when one edge thereof is flattened as mentioned hereinabove, is that a perceptible flicker appears on opposite sides of the resulting images. Thus, if such a dual-lens system is used in projecting composite screen images, the upper and lower portions of the screen image will flicker to a perceptible degree if the lens systems are vertically disposed with respect to each other. Careful experiments show that such flicker is caused by light rays passing through the extreme outer edges of the lens systems, and more particularly those edges diametrically opposite to the flattened surfaces.

It is an object of the present invention to provide a novel structure and method for eliminating such flicker. In the preferred embodiment this is done by grinding or otherwise cutting off the outermost edges of each lens structure, and the objects of the present invention include such a lens construction, as well as a novel method of forming such lens structures.

Regardless of the use to which such a double-lens means is put, it is desirable to be able to move the lens structures relative to the frames and relative to each other. Thus, in using the lens structures for simultaneous projection of constituent images to form a composite screen image, it is necessary that the constituent images be brought into accurate registration with each other. The present invention includes a novel lens mount and a novel adjustment structure therefor which permits adjustment for both lateral and longitudinal registration, as well as for focus, and also includes a novel method of so moving the lens structures that registration of the screen images is readily accomplished.

In this lens mounting structure I prefer to adjustably mount the lens systems so that one or both can be moved toward or away from the other. In designing a structure permitting this adjustment I prefer to pivot one or both lens structures. It is an object of the present invention to provide a lens structure pivoted about an axis lying between this lens structure and the film and preferably positioned close to the film.

Further objects and advantages of the invention will be made evident hereinafter.

Referring to the drawing.

In forming the lens structures of my invention I find that commercially available lenses, even though identically marked and formed to identical specifications, are usually not matched to such extent that two of such lenses can be selected at random to form the lens means of the invention. I have found that in order to successfully use two lens systems, it is necessary to very accurately match these systems. In the matter of focus, for instance, commercially available lenses, even though sold to be of identical construction, will vary in focal length to such a degree that a promiscous selection will fail to meet the very exacting requirements.

The first step, then, in matching lens systems is to very accurately measure the focal distances of a large number of commercially available lenses or to very accurately manufacture lens structures of identical focal length. This often requires microscopic determination or other actual comparative tests under greatly magnified conditions. Further, it is necessary that the lens systems must be very accurately matched for definition. In this connection the maximum permissible circle of confusion in the center of the frame should be .001" or less, while this circle of confusion in the corners of the frame should be .002" or less, these figures being referred to the usual film frame. In less accurate work, however, it is sometimes possible to design the lens systems with somewhat larger permissible circles of confusion than those mentioned. However, if the lens systems are not properly matched for definition proper registration and sharp focus of the resulting images will not be obtained, thus making it impossible to form satisfactory composite or superimposed images.

It is also necessary to very accurately determine the optical axis of each lens system. This can be done by any well-known means. It will usually be found that this optical axis is not located at the exact center of the lens element, but will lie to one side thereof. Commercially available lens structures vary quite widely in this regard.

It is preferable to then select a vertical axis passing through the optical axis of each lens structure. It is usually desirable, though not always necessary, to choose this axis along the radial line connecting the optical axis to the nearest point on the periphery of the lens system. Subsequent processing takes place with reference to this vertical axis and with reference to the optical axis rather than with respect to the exact central axis of the lens structure.

Figure 5:
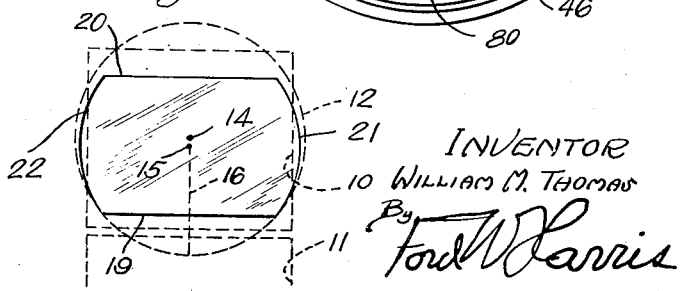
Fig. 5 is a diagrammatic view illustrating the steps and principles used in forming the lens structure.

In selecting lens structures for use with a given size frame of a motion picture film, it is usually necessary to choose a lens structure in which the lens elements are of a diameter greater than the center-to-center spacing of the adjacent frames so that a large amount of light will move through the lens system. Thus, as illustrated in Fig. 5, I have indicated upper and lower frames by dotted lines 10 and 11, and have indicated by dotted lines 12 the original contour of the commercially available lens system, the geometric center of this lens system being indicated by the numeral 14. As previously mentioned, the optical axis is usually positioned to one side of the center of the lens, this optical axis being indicated by the numeral 15. The selected vertical axis is in this instance indicated by the dotted line 16.

In order that the optical axis of the two lens systems be spaced a distance apart substantially equal to the center-to-center spacing of the frames, I prefer to grind off adjacent portions of the lens structures. Thus, with the lens indicated in Fig. 5, the lower edge is ground off to form a flattened surface 19. This surface is preferably flat and lies in a plane perpendicular to the vertical axis 16. The distance between the optical axis 15 and the flattened surface 19 is made somewhat less than one-half the center-to-center spacing of the adjacent frames so that the flattened surfaces 19 of the two lens systems will be parallel to each other but spaced a slight distance apart for a purpose to be hereinafter described.

In some instances lens structures thus formed can be used quite satisfactorily without further processing thereof. In other instances it has been found that if vertically disposed lens systems such as these are utilized, the upper and lower portions of the composite image will perceptibly flicker, while if horizontally disposed lens systems are utilized, the side or horizontally disposed portions of the composite image will thus flicker. I have found that this flicker is caused by the light rays passing through the extreme edges of the lens systems, and particularly through the extreme edge which is diametrically disposed with respect to the flattened surface 19. By cutting away this diametrically disposed edge, this difficulty is entirely overcome. In Fig. 5 such a cut-away edge is indicated by the numeral 20 and is shown as extending parallel to the flattened surface 19. If the upper edge of the upper lens system is thus cut away, together with the lower edge of the lower lens system, it will be found that entirely satisfactory results are obtained by a dual-lens means thus formed. It is preferable to cut away these edges to such an extent that the distance between the optical axis 15 and the cut-away edge 20 is substantially equal to the distance between this optical axis and the flattened surface 19. This is, however, not invariably the case, though better results are obtained if the amount of material above the optical axis 15 is substantially equal to the amount of material therebelow. In other instances, however, it is possible to cut away a smaller portion of the outer edges of the lens systems so that the distance between the optical axis and the cut-away edge 20 will be greater than the distance between this axis and the flattened surface 19.

It is also desirable to grind off the remaining curved edges of the original lens structure so that they are concentric with the optical axis 15 rather than being concentric with the geometric center. In Fig. 5 I have shown these edges as being slightly ground off to form side edges 21 and 22. This provision permits as easy mounting of the lens elements in the lens barrel and also gives more equal illumination at each side of the aperture.

With such a lens system it will be clear that the distance between the cut-away edge 20 and the flattened surface 19 will be substantially less than the transverse distance between the side edges 21 and 22. So also, the distance between the optical axis 15 and the flattened surface 19 is substantially less than one-half of this transverse dimension.

The above principles can be followed regardless of whether vertically disposed or horizontally disposed lens systems are to be utilized, and in this connection it should not be understood that the term "vertical axis" is limited to a vertically disposed pair of lens systems. Removal of the extreme outer portions of each lens system will eliminate any perceptible flicker when such lenses are used for projection purposes regardless of whether or not vertically or horizontally disposed lens structures are utilized.

Usually each lens structure includes a plurality of lens elements designed to produce an image which is as nearly optically correct as possible. In such instances it is usually desirable to flatten each of the lens elements included in the lens system, especially when forming the flattened surfaces 19. In some instances it is possible to form the cut-away edges 20 on only certain of the lens elements of each system, though best results are usually accomplished by thus cutting away the edge portions of each of the elements.

Figure 3:
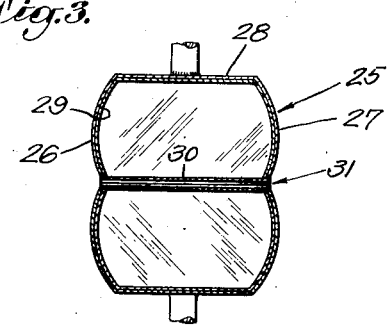
Fig. 3 is an enlarged view showing the lens structures in cross-section.

Any suitable lens mount may be utilized. It is preferable to form this lens mount in the form of a lens case such as shown in Fig. 3 and indicated by the numeral 25, this case being shaped to conform to the contour of the lens elements formed as previously described. The lens case 25 shown in Fig. 3 includes side walls 26 and 27 and a flat plate 28 respectively surrounding the side edges 22 and 21 and the cut-away edge 20 of each lens element. Each lens element is thus enclosed on three sides by the lens case 25, the lens elements being held in place by any suitable means such as by sleeves 29 or other spacing means. The open end of the lens case is in this instance closed by a septum plate 30 forming a part of a septum means 31 which extends from the front end of the lens system rearward toward the film, terminating adjacent the space between the frames of this film.

Figure 1:
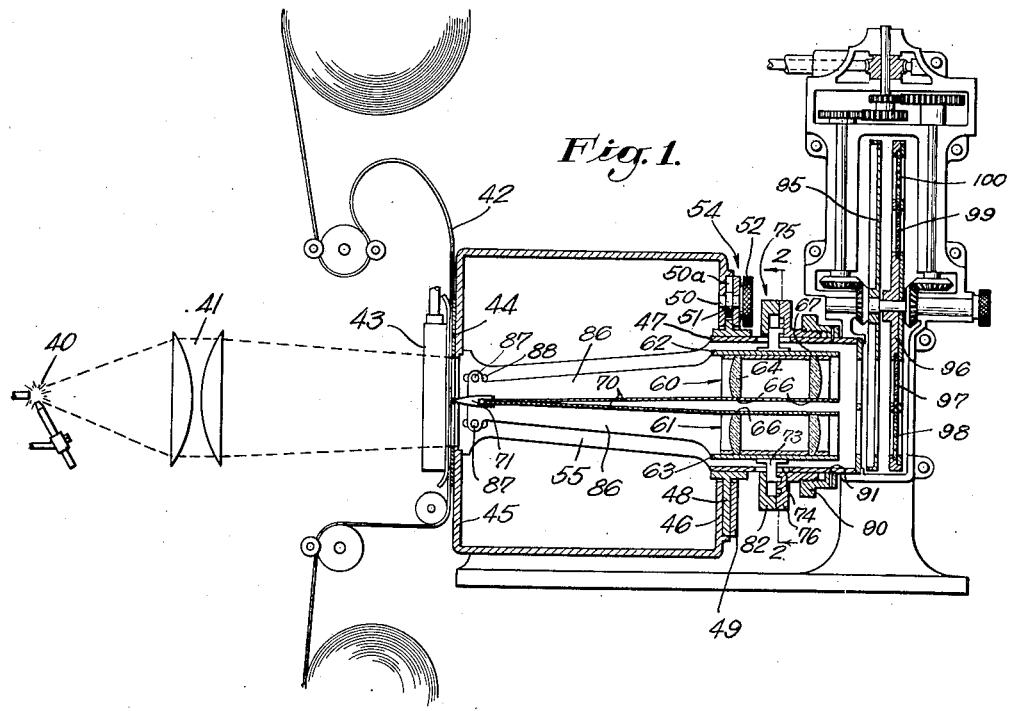
Fig. 1 is a vertical sectional view of a projector incorporating the lens system of the present invention.

One system of utilizing lens systems thus formed is illustrated in Fig. 1, which shows in detail the application of such lens structures to a projection device, and illustrates a novel adjustment means which may be used in conjunction with such a dual-lens means. Referring to this figure, I have shown a projector including a light source 40 and a condenser lens system 41 for directing a beam of light toward a film 42, this beam being of sufficient size to cover adjacent frames on the film. Any suitable film-advancing means, diagrammatically indicated by the numeral 43, may be used, it being preferable to utilize an aperture plate 44 providing a pair of openings respectively masking the adjacent images.

This aperture plate is secured to a rear wall 45 of an enclosing structure, this structure also including a front wall 46. An outer barrel 47 extends through an opening of this front wall and carries a flange 48 positioned between this front wall and a cover member 49, the outer barrel 47 being thus pivotally mounted with respect to the front wall 46. Such a pivotal movement can be effected by the use of a shaft 50 extending through a radially extending slot 50a formed inward from the periphery of the flange 48, this shaft carrying an eccentric 51. By rotating the shaft 50 as through a knurled head 52, the outer barrel will be pivoted slightly with respect to the front wall 46. This means whereby pivotal adjustment is effected is hereinafter termed a lateral adjustment means 54 and serves to bring the screen images into lateral registration.

This barrel is of cylindrical shape, and the rear section thereof is cut away at its upper and lower portions to form two arms 55 extending rearward on opposite sides of the light beams projected through the adjacent images. The rear ends of these arms are flattened and suitably secured to the rear wall 45. These arms are of sufficient flexibility to permit the slight pivotal movement of the outer barrel 47 to permit lateral adjustment of the screen images.

Positioned inside the outer barrel 47 are lens systems 60 and 61 respectively positioned in lens cases 62 and 63. These lens systems are designed in accordance with the principles hereinbefore set forth. As illustrated, each lens system includes a pair of lens elements 64. The adjacent edges of the lens elements included in the lens systems 60 and 61 are ground off to form flattened surfaces 66 previously described, while the diametrically opposed edge of each lens element 64 is cut away to form a cut-off edge 67 for the purposes hereinbefore mentioned.

The septum structure disclosed includes a pair of thin septum members 70 respectively closing the lens cases 62 and 63 and extending adjacent the flattened surfaces 66 of the lens elements. This septum structure also includes a U-shaped member 71 providing a forward extending opening into which the rear ends of the septum members 70 slidably extend. This U-shaped member is shown enlarged in Fig. 1 for the purpose of clarity and is suitably secured either to the arms 55 or to the rear wall 45 so as to extend adjacent the lineal space separating the adjacent images on the film 42. This septum means acts to separate the beams of light respectively passing through these adjacent frames, the lens structures 60 and 61 focusing the film images onto a screen so as to form two constituent images which, if brought into proper registration, will form a composite image.

To bring these constituent images into lateral registration, one of the lens systems may be shifted sidewise with respect to the other. In the embodiment shown, this slight shifting action is effected through the lateral adjustment means 54, any motion of the outer barrel 47 being transmitted to the lens systems 60 and 61 through arms 73 secured to the lens cases 62 and 63 and extending outward through openings 74 of the outer barrel 47. These openings 74 are elongated parallel to the optical axes as shown.

To permit vertical or longitudinal adjustment of the constituent images, it is desirable to be able to move the lens systems toward and away from each other in the plane of their optical axes. Either one or both of the lens systems can be thus moved. In the form shown both are simultaneously moved through the use of a longitudinal adjustment means 75 including a sleeve member 76 provided with two spiral grooves 78 and 79 of a shape best shown in Fig. 2. These grooves are non-intersecting and respectively receive pins 80 formed on the outer ends of the arms 73. A cover member 82 is secured to the sleeve member 76, the outer surfaces of these members being suitably knurled. Any rotation of the sleeve member 76 with respect to the outer barrel 47 will thus move the lens systems 60 and 61 toward and away from each other to bring the constituent images into vertical or longitudinal registration.

In designing a structure permitting this movement of the lens systems 60 and 61 toward and away from each other, I have found it preferable to respectively pivot the lens systems about axes lying between these lens systems and the film 42. If desired, the septum members 70 may be flexed to thus pivot the lens systems. In the preferred embodiment, however, each of the lens cases 62 and 63 provides a pair of rearward extending arms 86, each arm carrying a pin 87 extending through on opening 88 of the adjacent arm 55. These openings 88 are elongated in a direction parallel to the optical axes, and in the preferred embodiment the axis of each of the pins 87 is in alignment with the optical axis of the respective lens system. Thus, the lens systems 60 and 61 are pivoted about axes lying close to the film, these axes extending parallel to the face of this film.

To focus the constituent images on the screen it is necessary to simultaneously move the lens systems 60 and 61, or certain of the elements thereof, toward and away from the film. In the form shown the entire lens systems are simultaneously moved through the action of a focusing ring 90 which carries a plurality of pins extending into an annular channel 91 formed around the periphery of the outer barrel 47. The focusing ring 90 provides a threaded cavity into which a threaded portion of the sleeve member 76 extends. Thus, when it is desired to change the focus of the system, the operator holds the longitudinal adjustment means 75 stationary and turns the focusing ring 90. This moves the lens systems 60 and 61 toward and away from the film. When the longitudinal adjustment means 75 is turned without manual engagement of the focusing ring 90, the frictional engagement therebetween will turn the focusing ring 90 with the sleeve member 76 so that no change of focus will be effected at this time.

If moving pictures are to be projected, it is necessary to use a suitable shutter, such as indicated by the numeral 95. This shutter is driven in step with the film-advancing means 43 in any well-known manner, the particular drive means per se forming no part of the present invention, but being claimed in my copending application, Serial No. 698,997, filed November 21, 1933.

Similarly, if colored motion pictures are to be projected by the additive method, suitable color filters are interposed in the beams. In the system shown I have found it desirable to advance the film 42 one frame at a time so that each image is twice projected. With such a system it is desirable to use a rotating filter support such as indicated by the numeral 96, this filter support carrying dissimilar color filters 97 and 98 on one side thereof and color filters 99 and 100 on the other side thereof, the latter filters being reversed in position with respect to the former. Thus, the beam of light passing through the lens system 60 is first intercepted by a filter of one color and then by a filter of another, the film being advanced one frame in the meantime. With such a system adjacent images on the film 42 are of different color value, being exposed through a system of filters corresponding in color to the filters used in the projector shown in Fig. 1.

Figure 2:
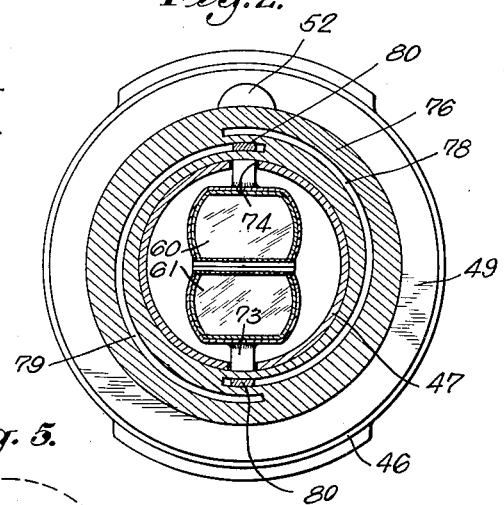
Fig. 2 is a sectional view taken through the lens structure as indicated by the line 2—2 of Fig. 1.
Figure 4:
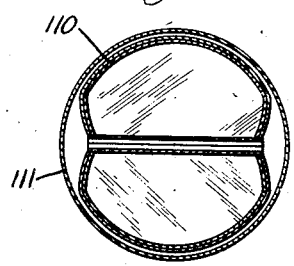
Fig. 4 is a view similar to Fig. 3 illustrating an alternative form of lens structure.

It should not be understood that I am limited to the shape of the lens element shown in Figs. 2, 3, and 5. In Fig. 4 an alternative form is illustrated. In this form of the invention the cut-away edges 20 (see Fig. 5) are not flat but are arcuate in form, as indicated by the numeral 110, being formed about a center positioned in the line joining the optical axes of the two lens systems. This construction very effectively eliminates the flicker hereinbefore mentioned and permits a very compact mounting of the two lens systems. In Fig. 4 the outer barrel is indicated by the numeral 111 and the lens elements need be only slightly smaller in combined dimension than this barrel in view of the fact that the rearward movement of the lens structures is relatively small.

It should not be understood that the lens systems herein disclosed are limited in utility to the projector system shown. These lens systems find utility in various other capacities, and if used in projection systems are not limited in utility to the projection of colored motion pictures. When used in the projection of conventional black-and-white images this lens system is particularly advantageous in that it greatly increases the intensity of the projected image. Various auxiliary effects can also be obtained by projection through adjacent lens systems.

I claim as my invention:

1. A double lens structure for use with a double aperture film gate in projecting superimposed images, comprising two lens elements in which the optical and geometrical axes are relatively displaced, with adjacent sides cut away perpendicular to the line joining said axes to form flattened surfaces and with their opposite sides also cut away, the optical and geometrical axes of both said lens elements lying in the same transverse medial line of said elements.

2. A double lens structure as set forth in claim 1 in which each of the lens elements has its entire contour, including both sides and ends, formed symmetrically with respect to its optical axis.

3. A double lens structure as set forth in claim 1, in which the lens elements are mounted in a holder with their optical axes relatively adjacent each other, and their geometrical axes toward the outer sides of the respective lens elements.

WILLIAM M. THOMAS.